United States Patent Office 3,115,661
Patented Dec. 31, 1963

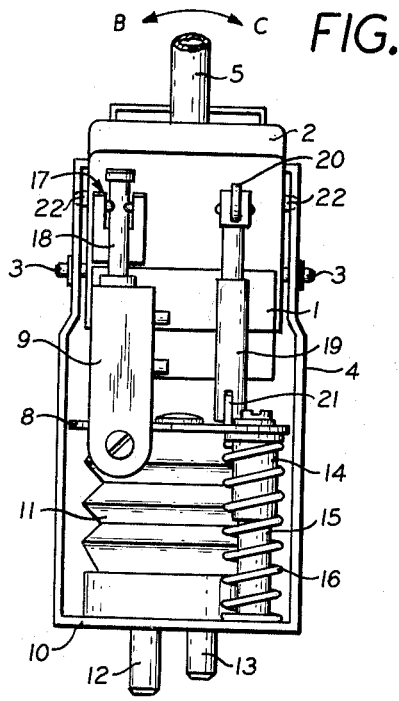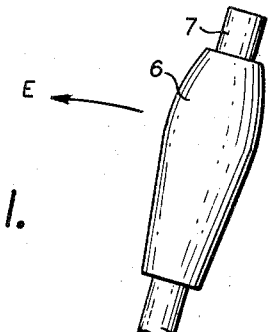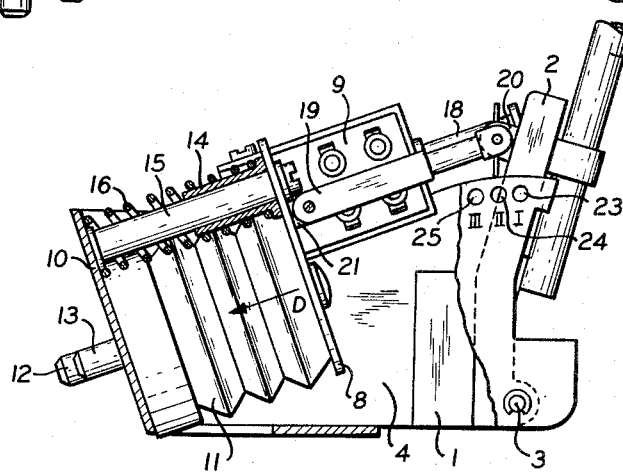

3,115,661
WINDSHIELD WASHER FOR AUTOMOTIVE VEHICLES
Heinrich Henss, Oberhochstadt, Taunus, Germany, assignor to VDO Tachometer Werke Adolf Schindling G.m.b.H., Frankfurt am Main, Germany, a corporation of Germany
Filed Aug. 28, 1962, Ser. No. 219,843
3 Claims. (Cl. 15—250.02)

The present invention relates to a windshield washer with a bellows pump and with a switch for a wiper motor coupled therewith for automotive vehicles, which have a stock switch for directional signals.

It is known to combine the bellows pump of windshield washers with the windshield wiper switch to a single unit, which is secured below the steering wheel on the steering wheel column, from which a stock-shaped operating member for a joint or alternate operation of the two devices projects. This arrangement has been satisfactory in the practice in those vehicles, which have directly below the steering wheel no other operating members in addition to the speed shifting lever. Numerous vehicle types have, however, a so-called stock switch for the directional signals, which is disposed, as a rule, opposite the gear shift lever on the steering wheel column, and which makes a proper incorporation of a wiper-washer-unit with a stock shaped operating member on the steering wheel column very difficult, if not entirely impossible.

It is, therefore, one object of the present invention to provide a windshield washer for automotive vehicles, which avoids these drawbacks.

It is another object of the present invention to provide a windshield washer for automotive vehicles, which comprises a bellows pump, a wiper-motor-switch and a stock switch, which are combined to a single unit in a joint housing, in which the stock switch is swingably mounted such and connected with the bellows pump and the wiper-motor, switch, that the operating member of the stock switch is useable also for the operation of the bellows pump and of the wiper-motor-switch.

It is yet another object of the present invention to provide a windshield washer for automotive vehicles, wherein the operating member of the so-called stock switch is swingable in two separate planes preferably perpendicular towards each other, whereby upon swinging of the operating member in one plane, only the switch for the directional signals and upon swinging in the other plane, the wiper motor switch and the bellows pump either additionally or alone, are operated. Errors in the operation of the unit are then practically impossible. Due to the joining of the three elements to a single structural unit with one single operating member, the confusing multiplicity of operating members required in many vehicles is reduced and the mounting operation is simplified.

With these and other objects in view, which will become apparent in the following detailed description, the present invention will be clearly understood in connection with the accompanying drawings, in which:

FIGURE 1 is a side elevation of the stock switch with a wiper-motor-switch and a bellows pump disposed in a housing, shown partly in section; and FIG. 2 is a top plan view of the entire unit.

Referring now to the drawings, the stock switch 1 for the directional signals is shown schematically only, since the switch per se is conventional and is not part of the present invention. The stock switch 1 is secured to a swinging plate 2, which is pivotally mounted in the housing 4 to swing about the pivot 3. A lever 5 is swingably mounted on the plate 2 for operation of the stock switch 1, which lever 5, upon swinging in the direction of the arrow B—C (FIG. 2) in a plane disposed parallel to the plate 2, causes the operation of the directional signals (not shown). At the free end of the lever 5 is provided a gripping portion 6, from which an operating knob 7 for an electrical switch projects, which electrical switch is disposed in the electrical circuit of the head lights. An additional plate 8 is disposed in the housing 4 perpendicularly to the swinging plane of the plate 2, the wiper-motor-switch 9 being secured to the plate 8 on the side opposite the plate 2. Between the other side of the plate 8 and a wall of the housing 4 a bellows pump 11 of the windshield washing device is disposed. Connection branches 12 and 13 of the bellows pump are provided and projected through the wall 10. The plate 8 is slidably mounted for movement in the direction of the arrow D against the force of a return spring 16 by means of a bushing 14 on a bolt 15 secured to the wall 10 adjacent to the bellows pump 11.

The switch 9 has an operating member 18 pivotally connected at the pivot means 17 to the swinging plate 2 (FIG 2). The swinging plate 2 is also connected with the plate 8 by means of a telescoping operating arm 19. The arm 19 is pivotally secured to projections 20 and 21, respectively, of the plates 2 and 8, respectively. In the swinging plate 2 conventional resting means 22 are provided, which cooperate with corresponding openings 23, 24 and 25, provided in the side walls of the housing 4.

The switch 9 has two switching positions for switching of the windshield motor switch for slow and fast operation. In the position of the plate 2, shown in FIG. 1 (resting position I), the wiper-motor-switch 9 is in its inoperative position. Upon swinging of the lever 5 and, thereby, of the plate 2 in the direction of the arrow E into the resting position II, determined by the opening 24, the first operative switching position of the switch 9 is put into operation by means of the arm 18, and the wiper motor will be in slow operation. Upon further swinging of the lever 5 in the direction of the arrow E into the resting position III of the plate 2, determined by the opening 25, the second operative switching step of the switch 9 becomes effective and the wiper motor operates at high speed. Upon still further swinging of the lever 5 in the direction of the arrow E, the switch 9 remains in operation, and the pump 11 is operated by means of the telescopic arm 19, which forms now a rigid member, and by means of the arm 18 and the plate 8. The return spring 16 returns the swinging plate 2 into the resting position III after each pumping stroke. From the above arrangement, it becomes apparent that depending upon the requirements, either the windshield wiper alone or jointly with the washer pump are put into operation, and furthermore, by swinging of the lever 5 in the direction of the arrow B—C, the directional signals may be switched on. If a fast start of the washer pump operation is required, it is possible to move the lever 5 in a single operational move in the direction of the arrow E for the operation of the pump 11. Instead of a bellows pump it is also possible, depending upon the type of the windshield washer device, to provide an electric switch for a pump motor, or in systems operating under pressure also a valve or the like may be provided. All these variations or equivalents are considered within the scope of the present invention.

While I have disclosed one embodiment of the present invention, it is to be understood that this embodiment is given by example only and not in a limiting sense, the scope of the present invention being determined by the objects and the claims.

I claim:

1. The combination of a windshield-washer device with a device for directional signal, comprising a housing having side walls and a rear wall, a swinging plate pivotally mounted in said housing, a stock switch secured to said swinging plate and adapted to operate directional signals upon positioning said stock switch into respective operative positions, a lever pivotally mounted intermediate its ends on said swinging plate to permit a swinging movement of said lever in a plane disposed parallel to the plane of said swinging plate, one end of said lever operating said stock switch from its inoperative position into its respective operative positions upon swinging said lever laterally within said plane parallel to the plane of said swinging plate into the respective operative positions for operation of the directional signals, a guide bolt secured to and projecting forwardly from said rear wall of said housing, an intermediate plate disposed in said housing substantially parallel to said rear wall of said housing and having a sleeve projecting rearwardly from said intermediate plate and receiving telescopically said guide bolt, resilient means tending to urge said intermediate plate in its forwardmost position in said housing, an arm having one end pivotally secured to said swinging plate and the other end pivotally secured to said intermediate plate, said arm pushing rearwardly said intermediate plate parallel to itself in said housing along the longitudinal axis of said guide bolt upon pushing said lever and, thereby, said swinging plate about the pivot of the latter in rearward direction, means operatively connected with said intermediate plate causing pressure to a window washer, a wiper-motor switch secured to said intermediate plate and having an operating bolt projecting forwardly from said wiper-motor switch for abutment with said swinging plate to be set from a forward inoperative position into a plurality of operative positions for different speeds of the window wiper, said wiper-motor switch being retained in its operative position for highest speed of said window wiper upon further rearward pushing of said lever together with said swinging plate for operation of the window washer, so that said single lever upon moving the latter laterally relative to said swinging plate in either direction the respective directional signals are operated and upon moving said lever rearwardly about the pivot of and jointly with said swinging plate at first only the respective operative positions of said wiper-motor switch are set and upon further movement of said same lever rearwardly said window washer is rendered operative, while the operative position of said wiper-motor switch for greatest speed is maintained.

2. The combination, as set forth in claim 1, wherein said means operatively connected with said intermediate plate causing pressure to a window washer comprises a bellows pump disposed between said intermediate plate and said rear wall of said housing, so that upon repeated alternate rearward and forward movements of said lever a pumping action is obtained in said bellows pump.

3. The combination, as set forth in claim 1, wherein said swinging plate has at least one lateral projection, and at least one of said lateral walls has a plurality of perforations spaced apart from each other and disposed along an arc of a circle the center of which coincides with the pivot axis of said swinging plate, and said lateral projection of said swinging plate being received in said respective perforations upon swinging rearwardly said swinging plate in correspondence with the respective operative positions of said wiper-motor switch.

References Cited in the file of this patent

UNITED STATES PATENTS 2,978,727     Forster _____ Apr. 11, 1961